INVENTOR.
Robert B. Taylor
BY Arthur R. Davis

INVENTOR.
Robert B. Taylor
BY Arthur R. Davis

ATTORNEY

INVENTOR.
Robert B. Taylor
BY
Arthur L. Davis
ATTORNEY

United States Patent Office 2,848,591
Patented Aug. 19, 1958

2,848,591

ENCLOSED INFRARED BROODERS

Robert B. Taylor, Fort Wayne, Ind., assignor to Rhinehart Development Corporation, a corporation of Indiana Application July 19, 1954, Serial No. 444,046

14 Claims. (Cl. 219—35)

This invention relates to brooders for livestock, pigs, poultry, and the like, particularly brooders in which infrared heating elements are used to maintain a predetermined comfort zone therein.

Infrared heating of brooders may be obtained by direct radiation from one or a cluster of infrared lamps, or from one or more reflecting units, as disclosed in my copending application Serial Number 394,052, filed November 24, 1953.

Infrared rays, often referred to as heat rays, are, in fact, a form of light. Infrared rays can be and are generated by heated bodies which give off substantially no visible light as the invisible infrared light of long wave lengths emanates therefrom. Such infrared rays cause heat to be produced on any object upon which the rays fall to the extent to which the rays are absorbed by the surface of such object.

Hence, with infrared lamps of high intensity the amount of useful heat available to animals or fowl in a brooder is that which is generated in the litter and on the animals or fowl in the brooder occupancy zone by virtue of absorption of these long wave length light waves.

These infrared light waves pass through clean air without affecting its temperature. The amount of heat generated on any surface upon which infrared light falls is not necessarily dependent upon the color of the object, but on the characteristics of the surface, particularly its ability to absorb the infrared radiation and convert it into heat.

In studying the effect of absorption of infrared rays, one must not assume that the temperatures which may be developed can be measured by an ordinary glass-walled mercury thermometer. Such a thermometer reflects a high percentage of infrared radiation and, therefore, the indicated temperature which may be attained is too low.

One can arrive at some fair estimate of the heat developed in the litter in the bottom of the brooder occupancy zone by placing a thermometer with the outside of the bulb coated with dull black pigment on the surface of the litter. Even these observations of temperature, while fairly good, are not necessarily the actual temperature developed on the hair or skin of animals or the down or feathers of fowl in the brooder, or the comfort of such occupants.

The thermometric values observed have been checked carefully by observation of the responses of the chicks themselves under a brooder. They invariably seek out the area of greatest comfort. The extent of any such comfort zone is indicated clearly by excessive congregation if such zone is relatively narrow, or by a general dispersion if such zone is relatively broad.

In any event, the isothermal patterns obtained in the occupancy zone beneath the radiation source depends upon a number of factors including: intensity at radiation source, distance from radiation source to the occupancy zone, quality of the litter in the bottom of the occupancy zone, extent to which the infrared radiation is absorbed and converted to heat in the litter and/or on the occupants of said zone, and to the extent that the heat so generated therein is reirradiated out of said occupancy zone.

The principal object of the present invention is to materially increase the area for greatest comfort in the occupancy zone of an infrared brooder which would otherwise have a high temperature gradient between the center and the periphery of such occupancy zone.

Another object of the invention is to provide for the maximum utilization of infrared radiation in a brooder by reflection of otherwise stray radiations in order that they may be absorbed by the contents of the occupancy zone of the brooder.

Still another object of this invention is to provide an infrared brooder wherein there is a minimum loss of infrared radiation absorbed and converted into heat by the contents of the occupancy zone of such brooder.

A further object of the present invention is to provide a cover or canopy for infrared brooders of either the direct radiation type or reflecting radiation type.

A still further object of the present invention is to provide a cover or canopy with a highly infrared reflecting inner surface for infrared brooders.

Other objects of this invention include the provision of a canopy or cover for infrared brooders which has a highly reflecting inner surface and at the same time is capable of transmitting sufficient visible light to permit observation of the occupants thereof.

I have discovered a significant improvement in the art of brooding animals and fowl using infrared radiation which provides from 1.5 to 10 times the isothermal area in the occupancy zone of a brooder and 5° to 20° F. higher temperature for corresponding isothermal areas as compared to an infrared brooder without said improvement.

More specifically, the present invention is an infrared brooder cover comprising a plastic film canopy capable of being disposed around the infrared source and the brooder occupancy zone, a canopy supporting element attached to the upper part of the plastic film and adapted to be attached above the irradiation source, spacing means near the bottom of the plastic film to maintain the canopy in a predetermined configuration and means depending from the spacing means to simultaneously provide immediate enclosure and ingress-egress communication for the occupancy zone.

In the accompanying drawings, which form a part of the specification, wherein reference symbols refer to like parts wherever they occur, Fig. 1 is a plan view of one embodiment of the present invention, Fig. 2 is a part elevational view of the embodiment of Fig. 1.

Figure 1:
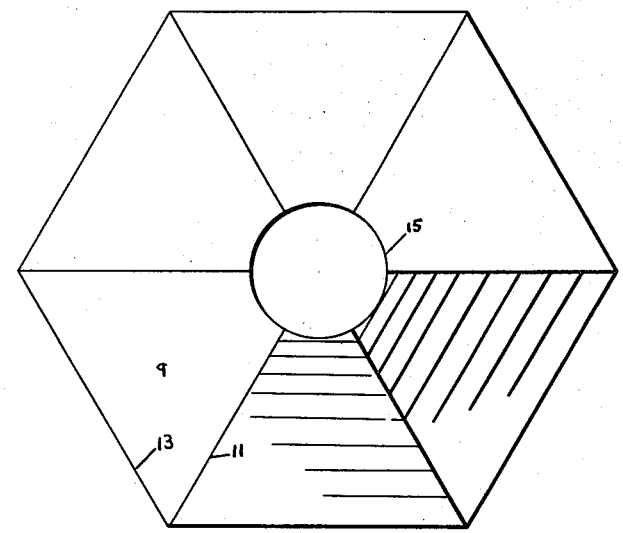
Figure 2:
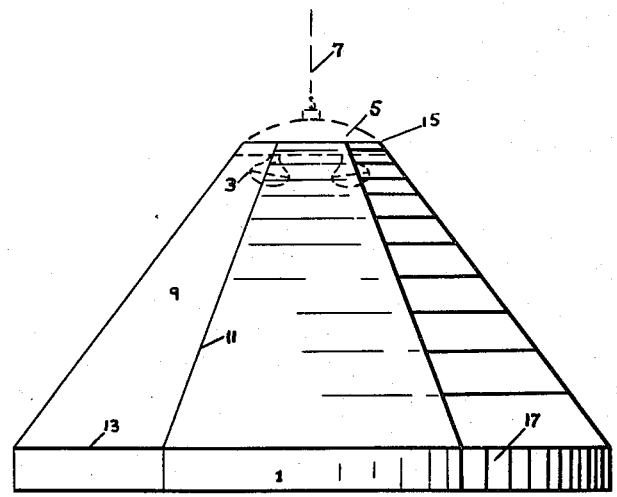

In Figs. 1 and 2, the occupancy zone 1 above the bottom of the brooder is heated by a direct radiating lamp or lamps 3 in fixture 5 held in position by cable 7, which may be affixed to a rigid primary support or to a counterweight (not shown). The flexible plastic film canopy or cover 9 is maintained in a predetermined configuration by spacers represented by spacer 13 and to a supporting member 15 to which is attached the upper part of cover 9. Supporting member 15 rests on fixture 5. The change in plane between adjacent panels is represented by 11. A flap or flaps, represented by flap 17, provide closures for avenues of ingress and egress for animal or fowl to and from the occupancy zone 1.

Figure 3:
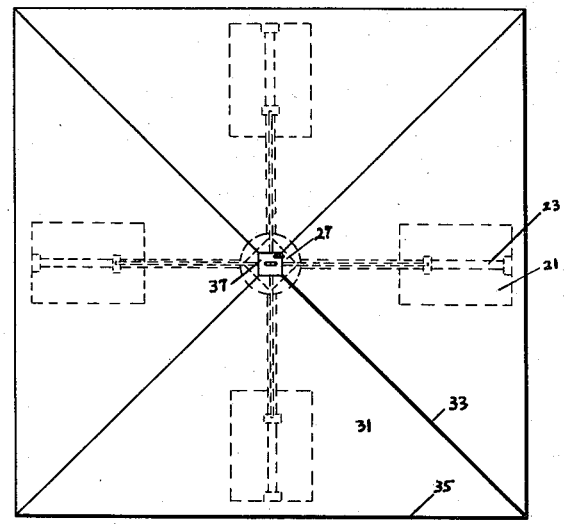
Fig. 3 is a plan view of another embodiment of this invention.
Figure 4:
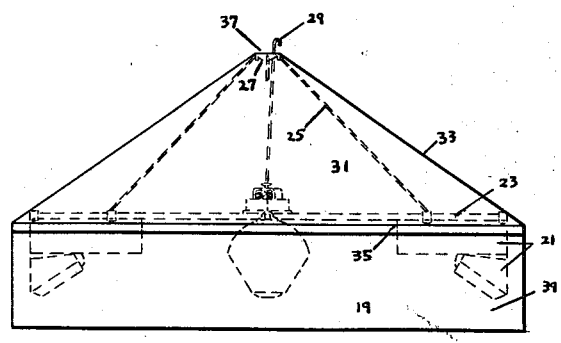
Fig. 4 is a part elevational view of the embodiment of Fig. 3.

In Figs. 3 and 4, the occupancy zone 19 above the bottom of the brooder is heated by a reflecting infrared lamps or units, represented by lamp unit 21, on crossarms 23 held in position by rods 25 attached to a common support member 27 joined to connector 29, which may be affixed to a rigid primary support or to a counterweight (not shown).

The flexible film canopy or cover 31 is maintained in the predetermined configuration by the length and weight of spacers 35. The change in plane between adjacent panels is represented by 33. The upper edges of cover 31 are attached to a supporting member 37 which rests on the infrared units support member 27. A side flap or flaps, represented by flap 39, provide a closure or closures for avenues of ingress and egress for animals or fowl to and from occupancy zone 19.

Figure 5:
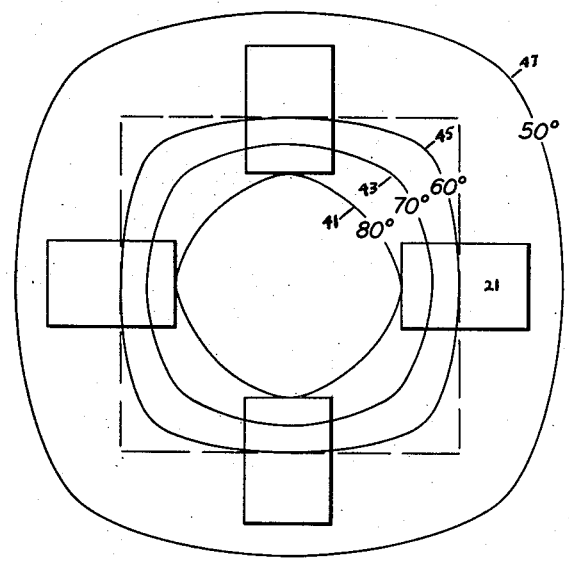
Fig. 5 shows typical isotherms in the occupancy zone of a brooder unit the same as shown in Figs. 3 and 4, except without a canopy.

In Fig. 5, the relative positions of the reflecting infrared lamp units 21 are shown in respect to 80°, 70°, 60° and 50° F. isotherms represented respectively by curves 41, 43, 45 and 47 in the brooder without a canopy or cover.

Figure 6:
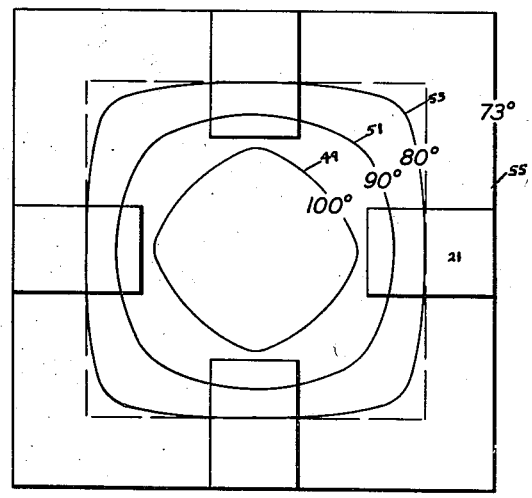
Fig. 6 shows typical isotherms in the occupancy zone of the brooder unit with a canopy as illustrated in Figs. 3 and 4.

In Fig. 6, the relative positions of the reflecting infrared units 21 are shown in respect to 100°, 90° and 80° F. represented respectively by curves 49, 51 and 53, in a brooder unit with the cover or canopy, in which the limit of the occupancy zone on one side is represented by 55, where the corresponding temperature is 73° F.

In conventional infrared brooders of the cluster type containing three or four bulbs, the radiated infrared light is directed at an angle toward the litter covering the floor of the brooder. The size of the pattern of heat generated and its configuration depend to some extent upon the angle at which the bulbs are mounted and the height of the assembly from the floor. In conventional brooders of this direct radiation type where the bulbs are supported so that the lower parts of the bulbs are 18 inches above the surface of the litter in the bottom of the occupancy zone, it was found that small areas with high heat values were developed in the center of relatively small diameter light patterns and that these values declined rapidly as measurements in successively contiguous concentric zones. Conventional infrared brooders of the type with which we are here concerned consist essentially only of a cluster of lights suspended above the floor of a large brooder room which may be heated to 60 to 70° F. or is often unheated.

In infrared brooders of the reflecting type, as described in my copending application, there is provided an increase in radiation with the simultaneous reduction of gradient of the reflected radiation over the entire area. This is true when the reflecting type units are used in a large brooder room in the same manner as the direct radiating cluster of the preceding paragraph.

The present invention is directed to materially improving the comfort and health of animals or fowl which may be brooded with either direct or reflecting type radiation units. The heating units and the occupancy zone are enclosed with a plastic film canopy or cover supported above the radiation source and enclosing the occupancy zone.

The plastic film canopy has an infrared reflecting inner surface which may be due to the film alone or specifically obtained by use of a coating, such as an aluminum metallized inner surface. Polyethylene is particularly suitable as a composition for the foldable plastic film for the construction of the canopy herein described and claimed.

The canopy is distended around the radiation source and the occupancy zone by supporting the top of the plastic film above the radiation source and maintaining a predetermined configuration of the film with spacers of suitable length and weight. These spacers may be applied to the film in any suitable manner, such as the equivalent of valance loops. The spacers may be rods or tubes. The ends of adjacent spacers are fitted into a short angular tube, thereby making possible an easily assembled canopy, which can be readily dismantled and stored in a small space as may be required.

The plastic film panels of predetermined configuration between the canopy support and the spacers extend downwardly to the top or somewhat above the top of the occupancy zone. At least one closure for ingress and egress with respect to the occupancy zone depends from one of the film panels above the spacers. Also, there may be a plurality of such closures below one film panel, or under each film panel, or any combination of single or multiple closures as may be required for the desired direction of movement of animals or fowl with respect to the brooder occupancy zone. The closures may be in the form of flaps affixed to the bottom of the respective film panels or may be extensions integral therewith.

In the several examples below, the results shown were obtained by measurement of the temperatures developed with standard laboratory thermometers, with bulbs coated previously with black India ink, placed two inches above the surface of a 2½ inch layer of "Sani-Flor" litter at the bottom of the brooder occupancy zone.

*Example 1*

One example is given for comparison of the measured isothermal patterns for (a) A 3-lamp direct infrared radiation brooder with 250 watt clear bulbs, 18 inches above the surface of the litter; no canopy or cover; ambient temperature 30° F.

(b) A 3-lamp direct infrared radiation brooder with 250 watt clear bulbs, 18 inches above the surface of the litter; a canopy or cover defining a hexagonal area of 2330 square inches, with the lower edges of the closures or flaps one inch above the surface of the litter; ambient temperature 30° F.

| Isotherm, °F. | (a) Without Canopy Area, sq. in. | (b) With Canopy Area, sq. in. |
|---|---|---|
| 100 | | 60 |
| 90 | | 340 |
| 80 | 60 | 640 |
| 70 | 320 | 1,220 |
| 60 | 660 | 2,330 |
| 50 | 1,240 | |

*Example 2*

Another example is given for comparison of the measured isotherm pattern for (a) A 4-lamp direct infrared radiation brooder with 250 watt clear bulbs, 18 inches above the surface of the litter; no canopy or cover; ambient temperature 48° F.

(b) A 4-lamp direct infrared radiation brooder with 250 watt clear bulbs, 18 inches above the surface of the litter, but with only 3 lamps in operation; a canopy or cover defining a hexagonal area of 2330 square inches, with the lower edges of the closures or flaps one inch above the surface of the litter; ambient temperature 44° F.

(c) A 4-lamp direct radiation infrared brooder with 250 watt clear bulbs, 19 inches above the surface of the litter; a canopy or cover defining a hexagonal area of 2330 square inches, with the lower edges of the closures or flaps 2 inches above the surface of the litter; ambient temperature 50° F.

| Isotherm, °F. | (a) 4-lamp Without Canopy Area, sq. in. | (b) 3-lamp With Canopy Area, sq. in. | (c) 4-lamp With Canopy Area, sq. in. |
|---|---|---|---|
| 110 | | 90 | 140 |
| 100 | | 320 | 720 |
| 90 | 160 | 550 | 910 |
| 80 | 660 | 850 | 1,380 |
| 70 | 880 | 1,250 | 2,330 |
| 66 | | 2,330 | |
| 60 | 1,420 | | |

Example 3

A further example is given for comparison of the measured isotherm pattern for (a) A 4-unit reflecting type infrared brooder, with a 250 watt clear bulb in each unit, the cross-arms immediately supporting the units being 16 inches above the surface of the litter; no canopy or cover; ambient temperature 65° F.

(b) A 4-unit reflecting type infrared brooder, with a 250 watt clear bulb in each unit, the cross-arms immediately supporting the units being 16 inches above the surface of the litter; a canopy or cover defining a square area of 3600 square inches, with the lower edges of the closures or flaps 2 inches above the surface of the litter; ambient temperature 50° F.

| Isotherm, °F. | (a) Without Canopy Area, sq. in. | (b) With Canopy Area, sq. in. |
|---|---|---|
| 100 | 140 | 320 |
| 90 | 650 | 1,020 |
| 80 | 1,290 | 1,760 |
| 70 | 2,300 | 3,600 |

From the above examples, it will be seen that use of the canopy or cover of the present invention provides approximately 1.5 to 10 times the isothermal area and approximately 5° to 20° F. higher temperature for the corresponding isothermal areas as compared to a corresponding infrared brooder without the canopy or cover.

It will be seen, therefore, that this invention actually may be carried out by the use of various modifications and changes without departing from its spirit and scope, with only such limitations thereon as may be imposed by the prior art.

I claim:

1. In a brooder in which must be maintained for the occupancy of live animals or fowls a predetermined comfort zone, the combination which comprises (a) an occupancy zone above the floor of said brooder wherein a substantial amount of any heat absorbed or generated in the bottom portion thereof is retained therein, (b) an infrared radiation source above said occupancy zone providing a very substantial proportion of radiation in the range of 7000 to 9000 Angstrom units, and (c) a separable foldable, plastic film cover enclosing said occupancy zone and said infrared source, said cover having low thermal conductivity and appreciable infrared reflectivity.

2. In the brooder as defined in claim 1 wherein (a) said brooder cover is generally tapered from the periphery of said occupancy zone, and (b) said brooder cover provides 1.5 to 10 times the isothermal area of an infrared brooder without said cover.

3. In the brooder as defined in claim 1 wherein (a) said brooder cover is generally tapered from the periphery of said occupancy zone, and (b) said brooder provides 1.5 to 10 times the isothermal area and 5° to 20° F. higher temperature for the corresponding isothermal areas as compared to an infrared brooder without said cover.

4. An infrared brooder cover comprising (a) a unitary, foldable plastic film canopy of low thermal conductivity and with an infrared reflecting inner surface, capable of enclosing a brooder occupancy zone and its infrared radiation source, said canopy being of substantially pyramidal configuration when extended and supported solely by the apex thereof around said occupancy zone.

5. An infrared brooder cover comprising (a) a unitary, foldable plastic film canopy of low thermal conductivity, transmitting visible light at least in part, and with an infrared reflecting inner surface, capable of enclosing a brooder occupancy zone and its infrared radiation source, said canopy being of substantially pyramidal configuration when extended and supported solely by the apex thereof around said occupancy zone.

6. An infrared brooder cover comprising (a) a unitary, foldable polyethylene film canopy of low thermal conductivity and with an infrared reflecting inner surface, capable of immediately enclosing a brooder occupancy zone and its infrared radiation source, said canopy being of substantially pyramidal configuration when extended and supported solely by the apex thereof around said occupancy zone.

7. An infrared brooder cover comprising (a) a unitary, flexible plastic film canopy of low thermal conductivity, and with an infrared reflecting metallized inner surface, capable of immediately enclosing a brooder occupancy zone and its infrared radiation source, said canopy being of substantially pyramidal configuration when extended and supported by the apex thereof around said occupancy zone, and said reflecting surface capable of reflecting infrared radiations in the range of the order of 7000 to 9000 Angstrom units.

8. An infrared brooder cover comprising (a) unitary, foldable polyethylene film canopy of low thermal conductivity, transmitting visible light at least in part, and with an aluminum metallized infrared reflecting inner surface, capable of immediately enclosing a brooder occupancy zone and its infrared radiation source, said canopy being of substantially pyramidal configuration when extended and supported by the apex thereof around said occupancy zone, and said reflecting surface capable of reflecting infrared radiations in the range of the order of 7000 to 9000 Angstrom units.

9. An infrared brooder cover comprising (a) a unitary foldable plastic film canopy capable of being disposed over a brooder occupancy zone, said film being of substantially pyramidal configuration when extended and supported only adjacent to the apex thereof with the film at intermediate elevations below said apex being self supporting, (b) a supporting element attached to the apex of said pyramidal configurated film, (c) a rigid horizontal spacer at the base of each film side to extend and maintain the unitary canopy in pyramidal configuration, and (d) at least one ingress-egress flap attached below at least one of said spacers.

10. An infrared brooder cover comprising (a) a unitary foldable plastic film canopy capable of being disposed over a brooder occupancy zone, said film being of a substantially pyramidal configuration when extended and supported only by the apex thereof with the film at intermediate elevations below said apex being self supporting, (b) a supporting element attached to the apex of said pyramidal configuration, (c) a spacer at the base of each triangular film side to extend the film canopy into pyramidal configuration, and (d) ingress-egress flaps attached to each spacer adapted to immediately enclose the brooder occupancy zone.

11. In a brooder with an infrared irradiation source above an occupancy zone for animals or fowl, the combination which comprises (a) an infrared radiation source above the occupancy zone, (b) a unitary, foldable plastic film canopy disposed around said infrared source and said occupancy zone, (c) a canopy supporting element attached to the upper part of said plastic film adapted to be attached above said irradiation source, (d) spacing means near the bottom of said plastic film canopy adapted to maintain said canopy in a predetermined distended configuration of substantialy panelled sides, and (e) at least one ingress-egress flap extending downwardly from a panelled side and adapted to provide communication with the occupancy zone.

12. In a brooder with an infrared irradiation source above an occupancy zone for animals or fowl, the combination which comprises (a) an infrared radiation source above the occupancy zone, (b) a unitary, foldable plastic film canopy disposed around said infrared source and said occupancy zone, (c) a canopy supporting element attached to the upper part of said plastic film and adapted to be attached above said irradiation source, (d) spacing means near the bottom of said plastic film canopy adapted to maintain said canopy in a predetermined configuration of substantially panelled sides, (e) a separable connector for ends of adjacent spacing means, and (f) at least one ingress-egress flap extending downwardly from a panelled side and adapted to provide communication with the occupancy zone.

13. In a brooder cover adapted to enclose an infrared radiation source and the occupancy zone of said brooder, the combination which comprises (a) a unitary, foldable plastic film canopy capable of being disposed around said infrared source and said occupancy zone, said film being of substantially pyramidal configuration when extended and supported only by the apex thereof with the film at intermediate elevations below said apex being self-supporting, (b) a canopy supporting element attached to the upper part of said plastic film and adapted to be attached above said irradiation source, (c) spacing means near the bottom of said plastic film canopy adapted to maintain said canopy in a predetermined distended configuration, and (d) means depending from said spacing means to effect simultaneous immediate enclosure and ingress-egress communication for said occupancy zone.

14. A brooder cover comprising (a) a separable unitary foldable plastic film structure with a configuration in the distended position of such structure as to enclose the brooder occupancy zone and a heating source therefor, and (b) means for centrally positioning said distended film structure around said occupancy zone, said film being of substantially pyramidal configuration when extended and supported only by the apex thereof with the film at intermediate elevations below said apex being self-supporting.

References Cited in the file of this patent
UNITED STATES PATENTS

| | | |
|---|---|---|
| 709,528 | Webber | Sept. 23, 1902 |
| 808,476 | Pier | Dec. 26, 1905 |
| 851,429 | Noble | Apr. 23, 1907 |
| 1,176,313 | Pfund | Mar. 21, 1916 |
| 2,287,635 | Nolte | June 23, 1942 |
| 2,358,091 | Marick | Sept. 12, 1944 |
| 2,492,258 | Berg | Dec. 27, 1949 |
| 2,493,589 | McCaskell | Jan. 3, 1950 |
| 2,564,708 | Mochel | Aug. 21, 1951 |
| 2,600,294 | Henry | June 10, 1952 |
| 2,702,546 | Gilroy et al. | Feb. 22, 1955 |